United States Patent [19]

Teuber et al.

[11] Patent Number: 5,089,924
[45] Date of Patent: Feb. 18, 1992

[54] TAPE CASSETTE WITH WEAR PAD COMPRISING POLYOLEFIN SHEET AND POLYAMIDE ADHESIVE LAYER

[75] Inventors: Vincent P. Teuber; Ramon F. Hegel, both of St. Paul, Minn.

[73] Assignee: Minnesota Mining and Manufacturing Company, St. Paul, Minn.

[21] Appl. No.: 452,254

[22] Filed: Dec. 18, 1989

[51] Int. Cl.$^5$ .............................................. G11B 23/04
[52] U.S. Cl. ..................................... 360/132; 242/198
[58] Field of Search ................ 360/132; 242/198–199; 156/272.2, 273.3, 308.2, 331.9

[56] References Cited

U.S. PATENT DOCUMENTS

| | | | |
|---|---|---|---|
| 3,978,341 | 8/1976 | Hoell | 250/492 |
| 4,022,395 | 5/1977 | Kishi | 242/198 |
| 4,022,401 | 5/1977 | Kishi | 242/198 |
| 4,163,533 | 8/1979 | Abe | 242/198 |
| 4,303,697 | 12/1981 | Baseden | 427/54.1 |
| 4,778,724 | 10/1988 | Bragole | 428/414 |
| 4,822,451 | 4/1989 | Ouderkirk et al. | 156/643 |
| 4,932,604 | 6/1990 | Maehara et al. | 242/199 |
| 4,965,690 | 10/1990 | Tanaka et al. | 360/132 |

OTHER PUBLICATIONS

Miller, Modern Plastics Encyclopedia, vol. 66, No. 11, pp. 76–78 (1989) (p. 77 is a full page ad and is not submitted herewith.)
Ghaffar et al., European Polymer Journal, vol. 12, pp. 615–620 (1976).
Ghaffar et al., European Polymer Journal, vol. 11, pp. 271–275 (1975).
Ghaffar et al., European Polymer Journal, vol. 13, pp. 89–93 (1977).
Ghaffar et al., European Polymer Journal, vol. 13, pp. 83–88 (1977).

*Primary Examiner*—John H. Wolff
*Attorney, Agent, or Firm*—Gary L. Griswold; Walter N. Kirn; David B. Kagan

[57] ABSTRACT

The present invention concerns a magnetic tape cassette housing comprising a polymeric cassette box having an interior surface. The interior surface of the cassette box has been irradiated with an amount of ultraviolet radiation sufficient to impart a priming effect to the interior surface of the cassette box. A wear pad is adhered to the interior surface of the cassette box. The wear pad comprises a low-friction, wear-resistant polyolefin sheet. The wear pad also comprises a polyamide adhesive layer coated on one side of the polyolefin sheet and adhering the polyolefin sheet to the interior surface of the cassette box. In another aspect, the present invention concerns a method of applying a polyolefin sheet to an interior surface of a polymeric cassette box.

22 Claims, 3 Drawing Sheets

TAPE CASSETTE WITH WEAR PAD COMPRISING POLYOLEFIN SHEET AND POLYAMIDE ADHESIVE LAYER

FIELD OF THE INVENTION

The present invention relates to tape cassettes, and more specifically to improved wear pads for use in tape cassettes.

BACKGROUND OF THE INVENTION

Tape cassettes having overlapping reels are known in the industry as "U-matic" tape cassettes. U-matic tape cassettes are described in U.S. Pat. Nos. 4,163,533 (the '533 patent) and 4,022,401 (the '401 patent). Such cassettes generally comprise a cassette box for housing a length of magnetic recording tape helically wound on a supply reel and a take-up reel. The reels are rotatably mounted in the cassette box for transferring the tape between the reels. The take-up reel comprises a hub which is formed with an upper flange extending radially outward from the top end of the hub. The supply reel comprises a hub which is formed with a lower flange extending radially outward from the bottom end of the hub. The reels are disposed in a side by side relationship such that a portion of the upper flange overlaps a portion of the lower flange.

Because the take-up reel has only one flange effective for guiding the magnetic tape wound on the take-up reel, the bottom wall of the cassette box has a raised portion for guarding the tape wound on the take-up reel. Similarly, because the supply reel has only a single flange effective for guiding the tape wound on the supply reel, the top wall has a depending portion for guiding the tape wound on the supply reel.

As the tape is guided by the raised portion or the depending portion, the edge of the magnetic tape may skive off shavings from the surface of the cassette box. This debris can collect on the tape and cause dropouts during recording or playback. Additionally, the edge of the magnetic recording tape may become frayed as the tape is guided by the raised portion or the depending portion. This, too, can impair magnetic performance during recording or playback.

To prevent such skiving of the cassette box and such fraying of the magnetic tape, both the raised portion and the depending portion are each covered with a low-friction, wear-resistant wear pad. The '533 and '401 patents disclose wear pads having a low-friction, wear-resistant layer comprising polytetrafluoroethylene (sold commercially under the trade name Teflon). There continues to be a need for improved wear pads which show low-friction and wear-resistant characteristics comparable to or better than polytetrafluoroethylene, but which are more economical to produce.

SUMMARY OF THE INVENTION

In one aspect, the present invention concerns a magnetic tape cassette housing comprising a polymeric cassette box having an interior surface. The interior surface of the cassette box has been irradiated with an amount of ultraviolet radiation sufficient to impart a priming effect to the interior surface of the cassette box. A wear pad is adhered to the interior surface of the cassette box. The wear pad comprises a low-friction, wear-resistant polyolefin sheet. The wear pad also comprises a polyamide adhesive layer coated on one side of the polyolefin sheet and adhering the polyolefin sheet to the interior surface of the cassette box.

In another aspect, the present invention concerns a method of applying a polyolefin sheet to an interior surface of a polymeric cassette box. The method comprises priming a surface of the polyolefin sheet. The primed surface of the polyolefin sheet is coated with a polyamide adhesive layer, thereby forming a wear pad. The interior surface of the cassette box is irradiated with an amount of ultraviolet radiation sufficient to impart a priming effect to the interior surface of the cassette box. The wear pad is applied to the surface of the polystyrene cassette box such that the polyamide adhesive layer is interposed between the polyolefin sheet and the cassette box.

By imparting a priming effect, it is meant that an improvement of the adhesion between the wear pad and the cassette box can be measured by the 180° Instron Adhesion Test as a result of irradiating the cassette box with ultraviolet radiation. The present invention is particularly well-suited for use in U-matic tape cassettes comprising wear pads bonded to the interior surfaces of the cassette box.

DESCRIPTION OF THE PREFERRED EMBODIMENTS

Figure 1:
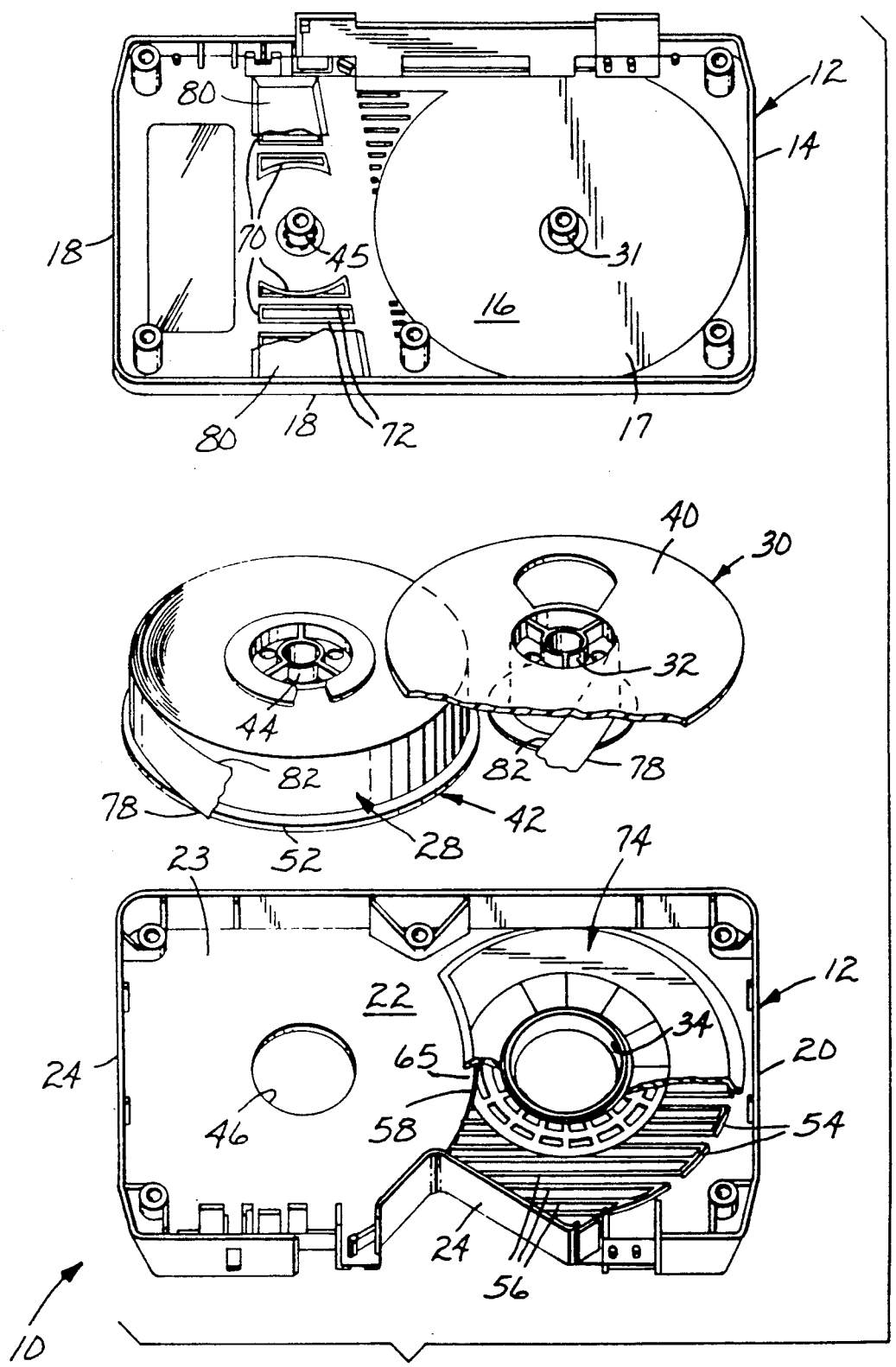
FIG. 1 is an exploded, fish eye view of a tape cassette according to the present invention with parts thereof broken away.
Figure 2:
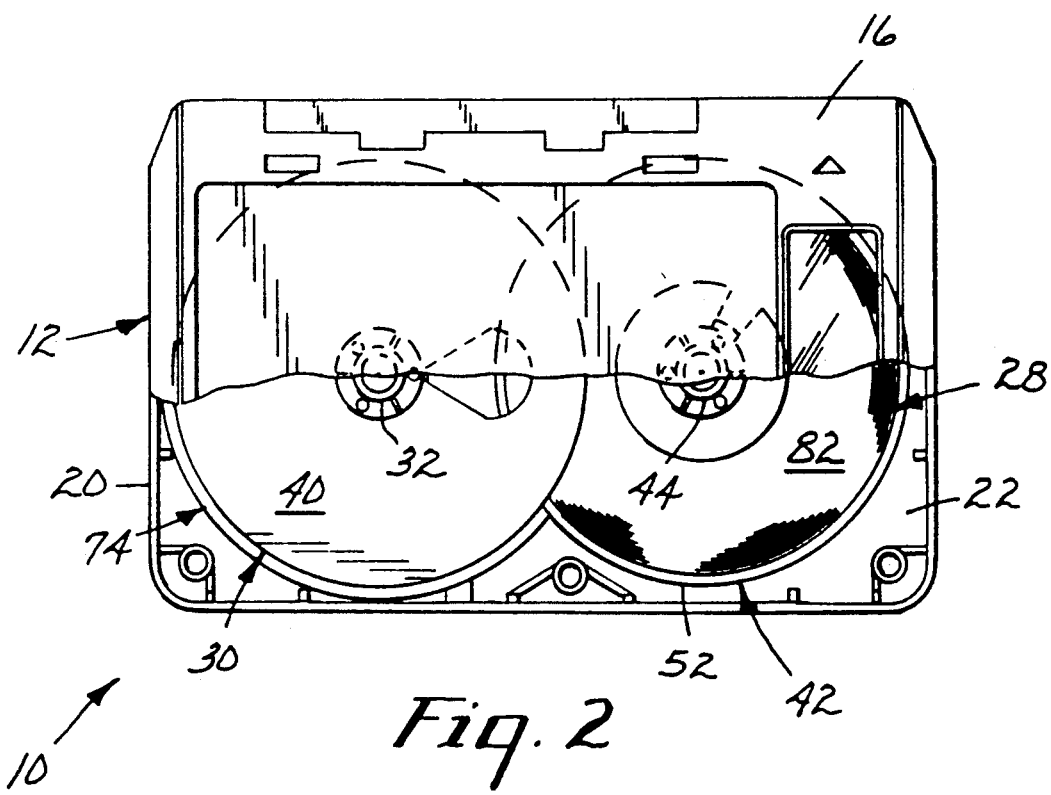
FIG. 2 is a top view of a tape cassette according to the present invention with parts thereof broken away.

Referring first to FIG. 1 and FIG. 2, there is shown a preferred tape cassette 10 according to the present invention. The tape cassette 10 comprises a generally rectangular cassette box 12 which may be formed from a suitable rigid polymer. Examples of suitable rigid polymers include a copolymer of acrylonitrile, butadiene, and styrene; a polypropylene oxide; a polyethylene; a polymethylmethacrylate; and a high impact polystyrene. Preferably, the cassette box 12 is formed from a polystyrene, such as a high impact polystyrene. An example of a particularly preferred high impact polystyrene is available commercially as Dow 498 Styron from Dow Chemical Company U.S.A., Midland, Mich. This high impact polystyrene is characterized by a vicat softening point of greater than 100° C. and an Izod Impact Strength of 1.2 lb$_f$/in$^2$.

The cassette box 12 has a top section 14 and a bottom section 20. The top section 14 comprises a top wall 16 and a peripheral flange 18. The bottom section 20 comprises a bottom wall 22 and a peripheral flange 24. In the assembled tape cassette 10, the top section 14 and the bottom section 20 are secured together such that the peripheral flanges 18 and 24 mate to define a peripheral sidewall of the cassette box 12.

A length of magnetic recording tape 28 is housed in the cassette box 12 and is helically wound on a tape take-up reel 30 and a tape supply reel 42. The tape reels 30 and 42 are rotatably housed in the cassette box 12 for transferring the magnetic recording tape 28 between the tape reels 30 and 42.

The take-up reel 30 may include a hub 32 which, at its upper and lower ends, is rotatably guided in a circular hole 34 provided in the bottom wall 22 and a shaft 31 provided in the top wall 16. An upper flange 40 for guiding the tape 28 wound on the take-up reel 30 extends radially outward from the hub 32 below the top wall 16.

The supply reel 42 may include a hub 44 which, at its upper and lower ends, is rotatably guided in a circular hole 46 provided in the bottom wall 22 and a shaft 45 provided in the top wall 16. A lower flange 52 for guiding the tape 28 wound on the tape supply reel 42 extends radially outward from the hub 44 above the bottom wall 22. As shown best in FIG. 2, the tape reels 30 and 42 are disposed in a side-by-side relationship such that a portion of the upper flange 40 overlaps a portion of the lower flange 52.

Since the take-up reel 30 has only a single, flange 40 effective for guiding the magnetic recording tape 28 wound on the take-up reel 30, the interior surface 23 of the bottom wall 22 has a raised portion 54 disposed in a position for guiding the magnetic recording tape 28 wound on the take-up reel 30. As shown best in FIG. 3 and FIG. 4, the raised portion 54 may be formed from a plurality of ribs 56. The raised portion is formed from a plurality of ribs 56 so that the raised portion 54 will cool at approximately the same rate as the rest of the cassette box 12 after injection molding. If raised portion 54 were to be formed from a single, solid portion, rather than from a plurality of ribs, the raised portion 54 would cool more slowly than the rest of the cassette box 12. Such differential cooling could lead to warpage, or distortion, of the molded article.

Referring again to FIG. 1, since the supply reel 42 has only a single flange 52 effective for guiding the magnetic recording tape 28 wound on the supply reel 42, the interior surface 17 of the top wall 16 has a depending portion 70 disposed in a position for guiding the magnetic recording tape 28 wound on the supply reel 42. Like the raised portion 54, the depending portion 70 may also be formed from a plurality of ribs 72.

Figure 3:
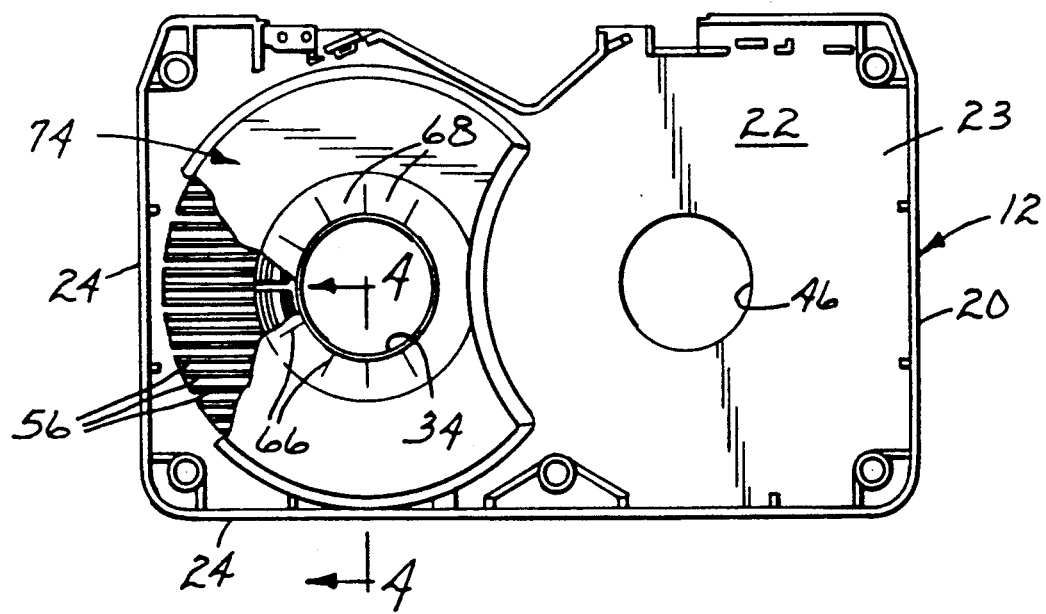
FIG. 3 is a top view of the bottom section of the tape cassette of FIG. 1 showing a wear pad attached to the interior surface of the bottom section, wherein parts of the wear pad are broken away.

The shapes of the raised portion 54 or the depending portion 70 are not critical so long as each of the portions provides an adequate guiding surface for the magnetic recording tape 28. For example, as seen in FIG. 1 and FIG. 3, the raised portion 54 may be generally circular in shape. The raised portion, however, is configured with a concave cut-out 58. The cut-out 58 provides room for the lower flange 52 of the supply reel 42 to rotate without contacting the raised portion 54. As seen in FIG. 1, depending portion 70 may comprise a pair of spaced apparent portions having a generally trapezoidal shape.

Figure 4:
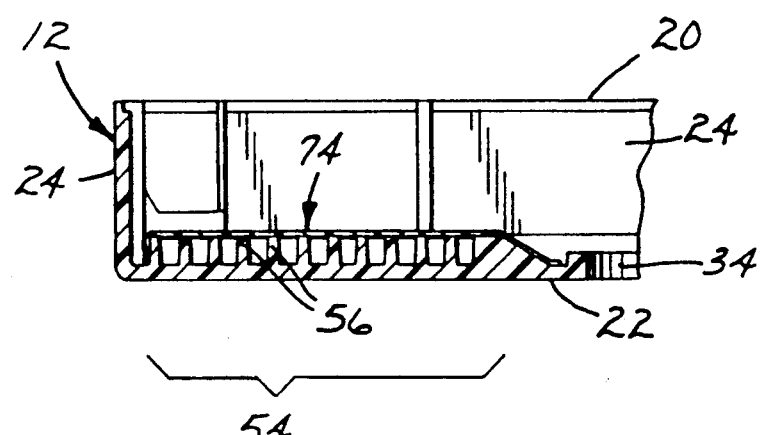
FIG. 4 is a cross-section of the bottom section shown in FIG. 3 taken along line 4—4.

Referring now to FIG. 3 and FIG. 4, a wear pad 74 is attached to the interior surface 23 of the bottom wall 22 such that the wear pad 74 overlies the raised portion 54. The wear pad 74 provides a low-friction, wear-resistant bearing surface for the lower edge 78 of the magnetic tape 28 as the magnetic tape is guided by the raised portion. It is preferred that the wear pad 74 be of a sufficient size such that, when the pad 74 is adhered to the interior surface 23 of the bottom wall 22, the wear pad 74 extends over the raised portion 54 and onto the flat 65 of the bottom wall 22 adjacent to the outer periphery of the raised portion 54.

Similarly, as shown in FIG. 1, another wear pad 80 is attached to the inside surface 17 of the top wall 16 such that the wear pad 80 overlies the depending portion 70. The wear pad 80 provides a low-friction, wear-resistant bearing surface for the upper edge 82 of the magnetic recording tape 28 as the magnetic recording tape 28 is guided by the depending portion 70.

The wear pads 74 and 80 may be each attached to the interior surface of the cassette box 12 in the same manner, and each wear pad may have the same structure and composition. Accordingly, for purposes of clarity and brevity, only the wear pad 74 will be discussed further herein.

Figure 5:
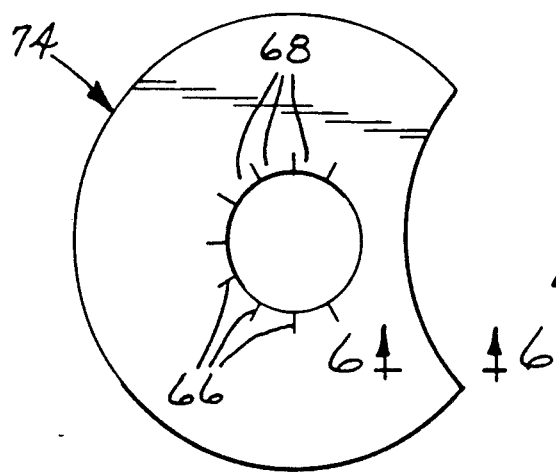
FIG. 5 is a top view of a wear pad according to the present invention.
Figure 6:
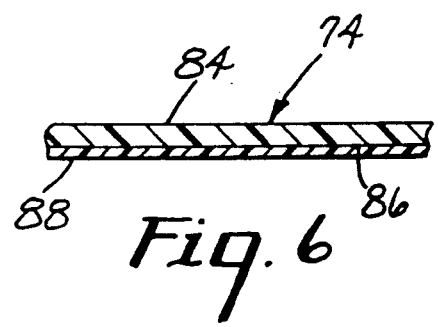
FIG. 6 is a cross-section of the wear pad shown in FIG. 5 taken along line 6—6.

Referring now to FIG. 5 and FIG. 6, there is shown a wear pad 74 according to the present invention. A plurality of radial cuts 66 are positioned around the inner periphery of the wear pad 74. The radial cuts 66 define a plurality of flaps 68 which can be conformed to the curved, top surface portions of the ribs 56 around the circular hole 34. The wear pad 74 comprises a low-friction, wear-resistant polyolefin sheet 84. The sheet 84 may comprise any polyolefin characterized by low friction and wear-resistance. Examples of suitable polyolefins would include polyethylene; polypropylene; copolymer of ethylene and polypropylene; copolymer of ethylene, propylene, and nonconjugated diene having only one polymerizable double bond; copolymer of ethylene, propylene, diene having only one polymerizable double bond, and nonconjugated diene in which both double bonds are polymerizable; and mixtures thereof.

Preferably, the sheet 84 comprises an ultra-high molecular weight polyethylene having a molecular weight of from about $2 \times 10^6$ to about $6 \times 10^6$. One example of a particularly preferred ultra-high molecular weight polyethylene is commercially available as Dixon #954 from Dixon Industries Corporation, Bristol, R.I. This polyethylene has an average molecular weight of about $4 \times 10^6$.

It is also preferred to prime one surface 86 of the polyolefin wear layer 84 in order to improve the adhesion of the polyolefin to the polyamide adhesive layer 88. One method for priming a polyolefin to improve adhesion of the polyolefin to an adhesive, as described in U.S. Pat. No. 4,778,724, involves first coating the surface of the polyolefin with a halogenated polyolefin and then irradiating the coated surface with ultraviolet radiation. As another option, the polyolefin may be primed by subjecting the surface of the polyolefin to a corona discharge treatment as is well known to those of ordinary skill in the art.

The thickness of the sheet 84 is not critical so long as the sheet 84 is characterized by low-friction and wear-resistant properties. A preferred thickness for the sheet 84 is from about 4 mils (0.10 millimeters) to about 5 mils (0.13 millimeters).

The wear pad 74 also comprises a polyamide adhesive layer 88 which is coated onto the primed surface of the polyolefin sheet 84. A particularly preferred polyamide adhesive for use in the polyamide adhesive layer 88 is a heat-activated polyamide adhesive commercially available as Sherex TS-01718 from Sherex Chemical Company, Inc., Dublin, Ohio. This heat-activated polyamide adhesive has a ball and ring softening point of about 117° C. and a viscosity of about 55 poise at 180° C.

The polyamide adhesive layer 88 may be coated onto the sheet 84 using any of a variety of coating methods, such as knife coating, hot extrusion coating, or solvent coating using either a gravure roll or a Meyer bar. For example, the polyamide adhesive layer may be solvent coated onto the sheet 84 from a mixture comprising the polyamide adhesive and a suitable solvent. When using the Sherex TS-01718 polyamide adhesive, a suitable formulation comprises 28 parts by weight of Sherex TS-01718 in 30 parts by weight of n-propanol and 42 parts by weight of toluene. Other suitable solvents would include other n-propanol/toluene solvents having different proportions of n-propanol and toluene; naptha; and water.

The mixture comprising the polyamide adhesive may be coated onto only a portion of the surface of the polyolefin sheet 84. Alternatively and more preferably, the solution is coated onto the full surface of the sheet 84. A wear pad 74 having a full surface bond between the sheet 84 and the adhesive layer 88 shows greater resistance to blistering or delaminating. After the solution is coated onto the sheet 84, the solvents are evaporated out in an oven. The polyamide adhesive layer 88 adheres the sheet 84 to the interior surface 23 of the bottom wall 22.

The thickness of the polyamide adhesive layer 88 is not critical so long as the layer 88 forms a uniform coating on the polyolefin sheet 84. However, a thicker polyamide adhesive layer would provide a stronger bond. A preferred thickness for the polyamide adhesive layer 88 is from about 0.2 mils to about 1.2 mils. More preferably, the polyamide adhesive layer 88 has a thickness of from about 0.4 mils (0.15 millimeters) to about 1.0 mils (0.25 millimeters).

In arriving at the present invention, the inventors investigated various potential substitutes for the polytetrafluoroethylene (Teflon) wear pad that would provide comparable low-friction and wear-resistant characteristics at a lower cost. Polyolefin wear pads, particularly polyolefin wear pads in which the polyolefin is an ultra high molecular weight polyethylene, showed the requisite low-friction and wear-resistant properties. These materials also would be substantially more economical to use than Teflon wear pads.

However, it proved to be difficult to arrive at a polyolefin wear pad that would be characterized by long-lasting adhesion between the polyolefin wear pad and the cassette box. It was found that the adhesives used to adhere a polyolefin sheet to a cassette box in general are vulnerable to lubricants such as fatty acids or fatty acid esters, and butyl myristate in particular, that tend to migrate from a magnetic recording tape over time. This migration is troublesome for at least two reasons. First, such lubricants may be absorbed by the adhesive used to adhere the wear pad to the cassette box. If this happens, the lubricants may plasticize the adhesive, causing the adhesive to weaken, or even to fail. Second, these lubricants also may be absorbed by the polyolefin sheet, causing the sheet to swell. If this happens, the weakened adhesive would be unable to prevent the wear pad from blistering or delaminating. What was needed in the art was a low-friction, wear-resistant, polyolefin wear pad comprising an adhesive layer having improved resistance to the plasticizing effects of such lubricants.

According to the present invention, it has now been discovered that a polyamide adhesive shows significantly better resistance against the plasticizing effects of fatty acid and fatty acid ester lubricants, and butyl myristate in particular, that tend to migrate from a magnetic recording tape over time. As a result, the present invention provides longer lasting, more durable adhesion of the polyolefin wear pad to the cassette box than can be achieved by using other adhesives which are more vulnerable to these plasticizing effects. For example, even when the polyolefin sheet is exposed to and absorbs such lubricants, practical tests have shown that the improved adhesion characteristics of the preferred embodiments are sufficiently strong and durable to resist blistering and delaminating from $-10°$ F. to $150°$ F. in dry environments, or up to $104°$ F. and 85% relative humidity in more humid environments.

To further improve adhesion between the wear pad 74 and the interior surface of the cassette box 12, the interior surface of the cassette box 12 preferably is irradiated with ultraviolet radiation before the wear pad 74 is adhered to the cassette box 12. It is not necessary to irradiate the entire interior surface of the cassette box 12 in order to improve adhesion between the wear pad 74 and the cassette box 12. Rather, according to the present invention, it is sufficient if only the surface that will subsequently underlay the wear pad 74 is exposed to the ultraviolet radiation.

Without this irradiating treatment, studies have shown that the strength of the polyamide to high impact polystyrene bond is about 100 grams per 0.75 cm of bond surface width as measured by the 180° Instron Adhesion Test. In comparison, when irradiating the surface of the cassette box with moderate dosages of ultraviolet radiation, the strength of the polyamide to high impact polystyrene bond increases to as much as about 450 grams per 0.75 cm of bond surface width as measured by the 180° Instron Adhesion Test.

Most commercial sources of ultraviolet radiation can be used in the present invention. For the purposes of the present invention, the term "ultraviolet radiation" is intended to mean electromagnetic radiation at wavelengths beyond the violet end of the spectrum in the range of from about 200 angstroms to about 4000 angstroms. For a preferred cassette box having a composition which comprises high impact polystyrene, the most pertinent radiation is the radiation emitted from the light source within the wavelength range of from about 2500 angstroms to about 2900 angstroms.

A preferred source of ultraviolet radiation is a quartz-jacketed mercury vapor lamp available commercially as "H" Bulb from Fusion Systems Corporation. Measurement of the amount of radiation emitted by this source can be accomplished by using an ultraviolet radiometer, such as Uvicure 254 available from Electronic Instrumentation and Technology, Inc., equipped with a 245 nm (2450 angstroms) to 260 nm (2600 angstroms) narrow band pass filter. From the intensity of the radiation measured by the radiometer and from the spectral energy distribution of the lamp as supplied by the lamp manufacturer, the total ultraviolet energy used in the pertinent wavelength range, for example, from about 2500 angstroms to about 2900 angstroms for high impact polystyrene, can be determined.

It is preferred to irradiate the cassette box 12 with ultraviolet radiation under ambient conditions in the presence of oxygen. It is believed that irradiation of the cassette box 12 in an inert atmosphere, e.g., a nitrogen-purged atmosphere, may not be as effective for improving adhesion of the wear pad 74 to the cassette box 12.

For a preferred cassette box 12 having a composition which comprises a high impact polystyrene, it is preferred to adjust the radiation exposure time so that the ultraviolet radiation energy received by the surface of the cassette box is from about 10 millijoules per square centimeter to about 250 millijoules per square centimeter, preferably from about 60 millijoules per square centimeter to about 100 millijoules per square centimeter, and more preferably about 75 millijoules per square centimeter.

At about 10 millijoules per square centimeter, the bond strength of the wear pad to the cassette box is about 200 grams per 0.75 cm of bond surface width according to the 180° Instron Adhesion Test, i.e., "200 g/cm". Practical tests have shown that the bond strength must be at least 200 g/cm in order to withstand environmental stresses from −10° F. to about 150° F. in dry environments, or up to 104° F. and 85% relative humidity in more humid environments. From about 60 millijoules per square centimeter to about 100 millijoules per square centimeter, the bond strength is from about 300 g/m to about 450 g/cm. . Above about 100 millijoules per square centimeter, no further improvement in bond strength can be detected by using the 180° Instron Adhesion Test, because the bond strength of about 450 g/cm is sufficiently strong such that coadhesive split of the polyamide adhesive is observed before adhesive failure can be observed between the adhesive and either the polyolefin sheet 84 or the cassette box 12.

Optionally, the surface of the cassette box underlying the wear pad 74 may be textured to further improve the adhesion of the wear pad 74 to the cassette box 12. For example, the surface of the cassette box 12 may be textured such that the surface has a surface roughness of 125 microinches (Ra). It has been found that imparting such texturing to the surface of the cassette box 12 increases the bond strength of the wear pad 74 to the cassette box 12 by about 50 to about 75 grams per 0.75 cm of bond surface width. It is preferred to impart texturing to the surface of the cassette box 12 in the mold during injection molding.

The invention will be further described by reference to the following examples.

EXAMPLE 1

Samples of wear pads according to the present invention were prepared as follows. A polyethylene sheet about 5 mils thick was skived from a roll of ultra high molecular weight polyethylene (Dixon #954 available from Dixon Industries Corporation) having an average molecular weight of about $4 \times 10^6$. One surface of the polyethylene sheet was primed with a corona discharge treatment. A polyamide adhesive layer was solvent coated onto the primed surface of the polyethylene sheet using a meyer bar coating process. The adhesive/solvent mixture comprised 28 parts by weight of a heat-activated polyamide adhesive (Sherex TS-01718 available from Sherex Chemical Company, Inc.), 30 parts by weight n-propanol, and 42 parts by weight of toluene. After coating the mixture onto the polyethylene sheet, the n-propanol and toluene were evaporated out in an oven at 115° C. for 1 minute. After evaporating out the solvents, the resulting composite was die cut into a number of wear pads having the shape shown in FIG. 5.

EXAMPLE 2

Samples of cassette boxes having the configuration shown in FIG. 1 were irradiated with ultraviolet radiation in accordance with the present invention in amounts of 0, 10, 15, 20, 30, 45, 60, 80, 125, and 250 millijoules per square centimeter. Ultraviolet irradiation was conducted with several types of commercially available quartz jacketed mercury vapor lamps, including an "H" bulb quartz jacketed mercury vapor lamp commercially available from Fusion Systems Corporation, Rockville, Md. The amounts of radiation received by the samples were measured with a Uvicure 254 ultraviolet radiometer available from Electron Instrumentation and Technology, Inc. Samples were passed 5 centimeters below the radiation source on a conveyor belt. The amount of ultraviolet radiation was varied by adjusting the speed of the conveyor belt as the conveyor belt passed beneath the radiation source.

EXAMPLE 3

Wear pads prepared in accordance with Example 1 were adhered to irradiated cassette boxes prepared in accordance with Example 2. The wear pads were adhered to the cassette boxes using a pressure of 80 psi and a temperature about 121° C. The bond strength of each of the samples was then tested using the 180° Instron Adhesion Test. The results are summarized in Table I:

TABLE I

| Experiment No. | Aged[1] | Textured[2] | Ultraviolet Radiation (millijoules/cm[2]) | Bond Strength[3] (grams per .75 cm of Bond Surface Width) | Standard Deviation |
|---|---|---|---|---|---|
| 1 | no | no | 0 | 68 | 17.2 |
| 2 | no | no | 15 | 129 | 20.5 |
| 3 | no | no | 20 | 159 | 39.4 |
| 4 | no | no | 30 | 260.5 | 73.3 |
| 5 | no | no | 60 | 404.5 | 23.1 |
| 6 | no | yes | 0 | 69.5 | 15.3 |
| 7 | no | yes | 15 | 175 | 22.0 |
| 8 | no | yes | 20 | 209 | 31.9 |
| 9 | no | yes | 30 | 330 | 67.1 |
| 10 | no | yes | 60 | 413.5 | 23.9 |
| 11 | yes | no | 0 | 78.5 | 10.1 |
| 12 | yes | no | 15 | 200.5 | 43.5 |
| 13 | yes | no | 20 | 320.5 | 37.9 |
| 14 | yes | no | 30 | 323 | 66.8 |
| 15 | yes | no | 60 | 442 | 54.6 |
| 16 | yes | yes | 0 | 98 | 9.8 |
| 17 | yes | yes | 15 | 254 | 43.1 |
| 18 | yes | yes | 20 | 281 | 50.8 |
| 19 | yes | yes | 30 | 427 | 66.9 |
| 20 | yes | yes | 60 | 490.5 | 36.9 |

As seen in Table I, these results demonstrate the significant improvement in adhesion provided by irradiating the cassette box with ultraviolet radiation. Samples in which the cassette box had not been irradiated with ultraviolet radiation or textured showed a bond strength of only about 70 grams per 0.75 cm of bond surface width, i.e., "70 g/cm". In comparison, samples in which the cassette box had been irradiated with moderate dosages of ultraviolet radiation of as little as 15 mj/cm$^2$ showed a bond strength of as much as about 200 g/cm, a three-fold improvement in bond strength. Moreover, samples in which the cassette box had been irradiated with 60 mj/cm$^2$ showed a bond strength of about 440 g/cm$^2$, more than a six-fold improvement in bond strength. It should also be noted that texturing further improved bond strength by about 50 g/cm to about 75 g/cm. The results also show that aging the samples at 150° C. for three days did not impair the bond strength of the wear pad to the cassette.

EXAMPLE 4

Wear pads prepared in accordance with Example 1 were adhered to irradiated cassette boxes prepared in accordance with Example 2. The wear pads were adhered to the cassette boxes using a pressure of 80 psi and a temperature above 121° C. Each of the cassette boxes used in this example were textured such that the interior surface of the cassette box had a roughness of about 125 microinches (Ra). The bond strength of each of the samples was tested using the 180° Instron Adhesion Test. The results are summarized in Table II:

TABLE II

| Experiment | Ultraviolet Radiation (millijoules/cm$^2$) | Bond Strength (g per .75 cm of bond surface width) |
|---|---|---|
| 1 | 0 | 80 to 100 |
| 2 | 10 | 130 to 160 |
| 3 | 15 | 160 to 200 |
| 4 | 20 | 260 to 330 |
| 5 | 45 | 400 to 500 |
| 6 | >45 | 400 to 500 |

These results show that no further improvement in bond strength can be detected by the 180° C. Instron Adhesion Test above about 45 mj/cm$^2$ for these samples. Above about 45 mj/cm$^2$, the bond strength ranged from about 400 g/cm to about 500 g/cm. At such bond strengths, coadhesive split of the polyamide adhesive was observed before adhesive failure was observed between the polyamide adhesive and either the polyolefin sheet or the cassette box.

What is claimed is:

1. A magnetic recording tape cassette housing, comprising:
   (a) a polymeric cassette box having an interior surface, wherein the interior surface of the cassette box has been irradiated with an amount of ultraviolet radiation sufficient to impart a priming effect to the interior surface of the cassette box; and
   (b) a wear pad adhered to the interior surface of the cassette box, said wear pad comprising:
      (i) a low-friction, wear-resistant, polyolefin sheet; and
      (ii) a polyamide adhesive layer coated on one side of the polyolefin sheet and adhering the polyolefin sheet to the interior surface of the cassette box.

2. The magnetic recording tape cassette housing according to claim 1, wherein the polyolefin sheet comprises a polyolefin selected from the group consisting of polyethylene; polypropylene; copolymer of ethylene and polypropylene; copolymer of ethylene, propylene, and nonconjugated diene having only one polymerizable double bond; copolymer of ethylene, propylene, diene having only one polymerizable double bond, and nonconjugated diene in which both double bonds are polymerizable; and mixtures thereof.

3. The magnetic recording tape cassette housing according to claim 1, wherein the polyolefin sheet comprises an ultra high molecular weight polyethylene.

4. The magnetic recording tape cassette housing according to claim 3, wherein the molecular weight of the ultra high molecular weight polyethylene is from about $2 \times 10^6$ to about $6 \times 10^6$.

5. The magnetic recording tape cassette housing according to claim 1, wherein the polyamide adhesive layer comprises a heat-activated polyamide adhesive.

6. The magnetic recording tape cassette housing according to claim 1, wherein the polymeric cassette box has a composition comprising a polymer selected from the group consisting of a copolymer of acrylonitrile, butadiene, and styrene; a polypropylene oxide; a polyethylene; a polymethylmethacrylate; and high impact polystyrene.

7. The magnetic recording tape cassette housing according to claim 1, wherein the polymeric cassette box has a composition comprising a high impact polystyrene.

8. The magnetic recording tape cassette housing according to claim 7, wherein the interior surface of the cassette box has been irradiated with an amount of ultraviolet radiation such that the ultraviolet radiation received by the interior surface of the cassette box is from about 10 millijoules per square centimeter to about 250 millijoules per square centimeter.

9. The magnetic recording tape cassette housing according to claim 7, wherein the interior surface of the cassette box has been irradiated with an amount of ultraviolet radiation such that the ultraviolet radiation received by the interior surface of the cassette box is from about 60 millijoules per square centimeter to about 100 millijoules per square centimeter.

10. The magnetic recording tape cassette housing according to claim 7, wherein the interior surface of the cassette box has been irradiated with an amount of ultraviolet radiation such that the ultraviolet radiation received by the interior surface of the cassette box is about 75 millijoules per square centimeter.

11. A magnetic recording tape cassette, comprising:
   (a) a polymeric cassette box having a top wall and a bottom wall, wherein the interior surface of the cassette box has been irradiated with an amount of ultraviolet radiation sufficient to impact a priming effect to the interior surface of the cassette box;
   (b) a length of magnetic recording tape;
   (c) a pair of overlapping tape reels upon which the magnetic recording tape is helically wound, said tape reels being rotatably housed in the cassette box for transferring the magnetic recording tape between the tape reels, wherein the first tape reel has an upper flange for guiding the magnetic recording tape that is wound on the first tape reel, and wherein the second tape reel has a lower flange for guiding the magnetic recording tape that is wound on the second tape reel, said tape reels disposed in a side by side relationship such that a portion of the upper flange overlaps a portion of the lower flange;

(d) a raised portion on the bottom wall disposed in a position for guiding the magnetic recording tape that is wound on the first tape reel;

(e) a depending portion on the top wall disposed in a position for guiding the magnetic recording tape that is wound on the second tape reel;

(f) a first wear pad attached to the raised portion to provide a low-friction, wear-resistant bearing surface for the edge of the magnetic recording tape as the magnetic recording tape is guided by the raised portion, said first wear pad comprising:
  (i) a low-friction, wear-resistant, polyolefin sheet; and
  (ii) a polyamide adhesive layer coated on one side of the polyolefin sheet and adhering the polyolefin sheet to the raised portion; and (g) a second wear pad attached to the depending portion to provide a low-friction, wear-resistant bearing surface for the edge of the magnetic recording tape as the magnetic recording tape is guided by the depending portion, said second wear pad comprising:
  (i) a low-friction, wear-resistant, polyolefin sheet; and
  (ii) a polyamide adhesive layer coated onto one surface of the polyolefin sheet and adhering the polyolefin sheet to the depending portion.

12. The magnetic recording tape cassette according to claim 11, wherein the polyolefin sheet comprises a polyolefin selected from the group consisting of polyethylene; polypropylene; copolymer of ethylene and polypropylene; copolymer of ethylene, propylene, and nonconjugated diene having only one polymerizable double bond; copolymer of ethylene, propylene, diene having only one polymerizable double bond, and nonconjugated diene in which both double bonds are polymerizable; and mixtures thereof.

13. The magnetic recording tape cassette according to claim 11, wherein the polyolefin sheet comprises an ultra high molecular weight polyethylene.

14. The magnetic recording tape cassette according to claim 13, wherein the molecular weight of the ultra high molecular weight polyethylene is from about $2 \times 10^6$ to about $6 \times 10^6$.

15. The magnetic recording tape cassette according to claim 11, wherein the polyamide adhesive layer comprises a heat-activated polyamide adhesive.

16. The magnetic tape cassette according to claim 11, wherein the polymeric cassette box has a composition comprising a polymer selected from the group consisting of a copolymer of acrylonitrile, butadiene, and styrene; a polypropylene oxide; a polyethylene; a polymethylmethacrylate; and high impact polystyrene.

17. The magnetic tape cassette according to claim 11, wherein the polymeric cassette box has a composition comprising a high impact polystyrene.

18. The magnetic recording tape cassette according to claim 17, wherein the interior surface of the cassette box has been irradiated with an amount of ultraviolet radiation such that the ultraviolet radiation received by the interior surface of the cassette box is from about 10 millijoules per square centimeter to about 250 millijoules per square centimeter.

19. The magnetic recording tape cassette according to claim 17, wherein the interior surface of the cassette box has been irradiated with an amount of ultraviolet radiation such that the ultraviolet radiation received by the interior surface of the cassette box is from about 60 millijoules per square centimeter to about 100 millijoules per square centimeter.

20. The magnetic recording tape cassette according to claim 17, wherein the interior surface of the cassette box has been irradiated with an amount of ultraviolet radiation such that the ultraviolet radiation received by the interior surface of the cassette box is about 75 millijoules per square centimeter.

21. The magnetic recording tape cassette according to claim 11, wherein the interior surface of the cassette box underlying said first wear pad has been textured.

22. The magnetic recording tape cassette according to claim 21, wherein the surface of the cassette box underlying said second wear pad has been textured.

* * * * *

UNITED STATES PATENT AND TRADEMARK OFFICE
CERTIFICATE OF CORRECTION

PATENT NO. : 5,089,924
DATED : February 18, 1992
INVENTOR(S) : Teuber et al.

It is certified that error appears in the above-identified patent and that said Letters Patent is hereby corrected as shown below:

Col. 8, footnotes at the bottom of TABLE I:

[1] Aged samples were placed in a 150°C oven for 3 days prior to testing for bond strength.

[2] For textured samples, the interior surface of the cassette box underlying the wear pad was textured such that the interior surface had a roughness of about 125 microinches (Ra).

[3] Each reported value for bond strength is an average value from tests of 20 samples.

Signed and Sealed this

Tenth Day of August, 1993

Attest:

MICHAEL K. KIRK

Attesting Officer

Acting Commissioner of Patents and Trademarks